(12) United States Patent
Yang et al.

(10) Patent No.: US 8,805,404 B1
(45) Date of Patent: Aug. 12, 2014

(54) MOBILE DEVICE TRACKING USING GROUP DYNAMICS

(75) Inventors: Shun-Fa Yang, Taipei (TW); Yen-Ju Lee, Taipei (TW)

(73) Assignee: Trend Micro, Inc., Tokyo (JP)

( * ) Notice: Subject to any disclaimer, the term of this patent is extended or adjusted under 35 U.S.C. 154(b) by 7 days.

(21) Appl. No.: 13/545,884

(22) Filed: Jul. 10, 2012

(51) Int. Cl.
*H04W 24/00* (2009.01)
*H04W 4/02* (2009.01)

(52) U.S. Cl.
CPC ............... *H04W 4/02* (2013.01); *H03W 64/00* (2013.01)
USPC ................ 455/456.1; 455/456.2; 455/456.3

(58) Field of Classification Search
CPC ....... H04W 4/02; H04W 64/00; H04W 68/00; H04W 84/10; H04W 8/005; H04W 4/023; H04W 4/18; H04W 4/20; H04W 76/007; H04W 88/06
USPC .................................. 455/456.1, 456.2, 456.3
See application file for complete search history.

(56) References Cited

U.S. PATENT DOCUMENTS

| | | | | |
|---|---|---|---|---|
| 7,015,817 | B2 * | 3/2006 | Copley et al. | 340/573.4 |
| 7,084,764 | B2 * | 8/2006 | McHugh et al. | 340/568.2 |
| 7,095,325 | B2 * | 8/2006 | McDonald et al. | 340/572.1 |
| 2006/0117010 | A1 * | 6/2006 | Hakala | 707/9 |
| 2010/0056173 | A1 * | 3/2010 | Bloom et al. | 455/456.1 |
| 2010/0164715 | A1 * | 7/2010 | Buller et al. | 340/539.32 |
| 2013/0260784 | A1 * | 10/2013 | Lutz | 455/456.1 |

* cited by examiner

*Primary Examiner* — David Q Nguyen
(74) *Attorney, Agent, or Firm* — Beyer Law Group LLP

(57) ABSTRACT

Any number of mobile devices each execute an application allowing them to subscribe to a group. Alternatively, the devices subscribe at a Web server. A percentage of the group and a distance threshold from a target device are defined. Each device sends its GPS data to a Web server or to one of the designated mobile devices. Alternatively, the target device calculates its distance to the other devices using wireless signals. The designated device or the Web server calculates the distance from the target device to the other devices. If the distance is over the threshold then an alert is generated and sent from the Web server to designated recipients, or sent from the designated device to the recipients. Distance from the target device to the group members may be calculated based upon a majority, a percentage of the group, or a special cluster of the group.

22 Claims, 7 Drawing Sheets

Group of Individuals

Group of Individuals

FIG. 1

Groups of Individuals

FIG. 2

Groups of Individuals

FIG. 3

Group of Individuals

FIG. 10B

MOBILE DEVICE TRACKING USING GROUP DYNAMICS

FIELD OF THE INVENTION

The present invention relates generally to tracking a mobile telephone. More specifically, the present invention tracks a mobile telephone of a user in relation to a group of such devices.

BACKGROUND OF THE INVENTION

Generally, most mobile telephones and other similar electronic devices include a GPS receiver that receives global positioning system signals in order to determine the geographic location of the telephone. A GPS receiver typically provides very accurate latitude and longitude information allowing the mobile telephone to calculate where it is located and to possibly display this information to a user or transmit that information to other users.

Needless to say, a host of smartphone applications have been developed that not only allow the holder of the smartphone to identify his or her location, but also allow another user to monitor the location of the holder of the smartphone. For example, applications exist that allow a parent or other individual to track the location of a child through the child's smart phone. Notwithstanding the fact that these applications are actually tracking the location of the smartphone, and not necessarily the child, these applications can be configured to allow a parent with a smartphone to monitor: the child's location at a particular time, whether or not there has been movement for a period of time, whether or not the child is approaching or leaving a particular location, speed of travel, etc.

Of particular interest are security applications that allow a parent to configure software on his or her smartphone that use predefined rules in order to determine whether or not the child is within the permitted area at a particular time. For example, a parent may configure an application on his or her smart phone to signal an alert if the child (or rather, the child's smart phone) leaves the geographic boundary of the child's school during normal school hours. Or, the parent may configure an alert to be generated if the child enters a particular geographic area (e.g., the shopping mall) at any time. Although more and more of these security applications are being developed, most all use complex configurations and numerous predefined rules in order to allow the application to detect if an alert should be generated. The application on the parent smartphone then constantly monitors the location of the child's smart phone.

While these applications can be helpful, they require configuration and definition of rules, and can be inflexible. Once a parent defines a geographic location and a particular time period, an alert will be generated if this rule is violated, even if the child is otherwise safe. Requiring the parent to constantly update the rules of the application can be more trouble than it is worth, often meaning that the application will go unused.

Accordingly, given the deficiencies in prior art approaches to monitoring the location of an individual carrying a mobile device, improved techniques are desired.

SUMMARY OF THE INVENTION

To achieve the foregoing, and in accordance with the purpose of the present invention, a technique is disclosed that monitors the location of an individual using group dynamics. This technique does not require a user to constantly configure the rules of the application—determination of whether an alert should be generated is based in part upon group dynamics. In one particular embodiment, the technique is well-suited for a mobile security application allowing an individual (such as a parent or guardian) to determine that another individual (such as a child) is safely with a known group. For example, should a child be with a school group and the school group leaves the school grounds to go on a field trip, no alert will be generated as long as the child (and his or her mobile telephone) remains with the school group. By contrast, a prior art application would generate an alert once the child leaves the school grounds because the prior application includes an inflexible rule that says the child may not leave the school grounds during school. Thus, the present invention makes use of group dynamics and group decision-making in order to determine whether or not to issue an alert.

In one embodiment, all mobile devices of a designated group send GPS data to a central Web server available over the Internet that holds configuration settings for the group. This GPS data may be sent using a wireless network, a telecommunications network, etc. The Web server then calculates the distance from the target device to the group (using any of various techniques described below), determines whether the distance is greater than a threshold, and sends an alert to any number of recipients if necessary.

In a second embodiment, configuration settings are held by a designated mobile device within the group (which may be the mobile device of the group leader, the target device of the protected individual, etc.), or by a third-party mobile device. The mobile devices within the group then send their GPS data to the designated mobile device which then calculates distance, determines whether the threshold is exceeded, and sends an alert if necessary.

In a third embodiment, the configuration settings and held by the mobile device belonging to the protected individual. This target mobile device then communicates wirelessly with the other mobile devices of the group (using Wi-Fi Direct, for example) in order to determine each distance from the target device to the other devices (using signal strength, for example). The target device then calculates a distance from the target device to the group (using any of the techniques described below), compares this distance to a threshold, and generates an alert if necessary.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, many consumer electronic devices now include a GPS receiver allowing the device to determine its geographic location. The present invention is applicable to any portable electronic device (such as a mobile telephone, smart phone, personal digital assistant, tablet computer, laptop computer, GPS navigation unit, etc.) that functions as a GPS navigation device by including a GPS receiver, GPS module or other. In addition, the invention is not limited to use of the United States' global positioning system for determining the location of the device. Other systems that provide location and time information (such as GPS III, the Next Generation Operational Control System, the Russian GLONASS, the European Union Galileo positioning system, and systems from China, India and other countries) may also be used. In fact, other techniques for determining relative position are described below.

The present invention makes use of the location of a target mobile device in relation to a group of other mobile devices in order to determine whether or not to issue an alert for the target mobile device. In other words, the target mobile device is not limited to a specific geographic location at a particular time. Should the group move to different geographic locations at different times, no alert is necessary as long as the target mobile device stays in somewhat close proximity to the group.

Dynamic Groupings of Individuals

Figure 1:
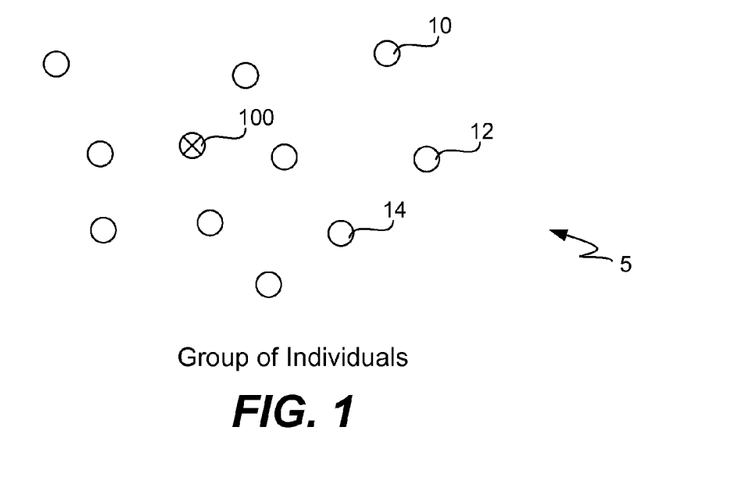
FIG. 1 is a block diagram showing a group of individuals having a known relationship with an individual.

FIG. 1 is a block diagram showing a group of individuals 5 having a known relationship with an individual 100. It is assumed that each individual is carrying some sort of mobile computing device for communication with others and for reporting his or her location. As shown, the individual 100 whose location is important (for example, a child) is shown more or less within the group of any number of other individuals 10, 12, 14, etc. In this situation, as long as individual 100 stays in close proximity to the group no alert is necessary because it will be assumed that the individual 100 is in good company. It may only be necessary for the individual to be in close proximity to another specific individual of the group, or to a certain percentage of the group, rather than requiring that the individual always be in close proximity to all group members.

Figure 2:
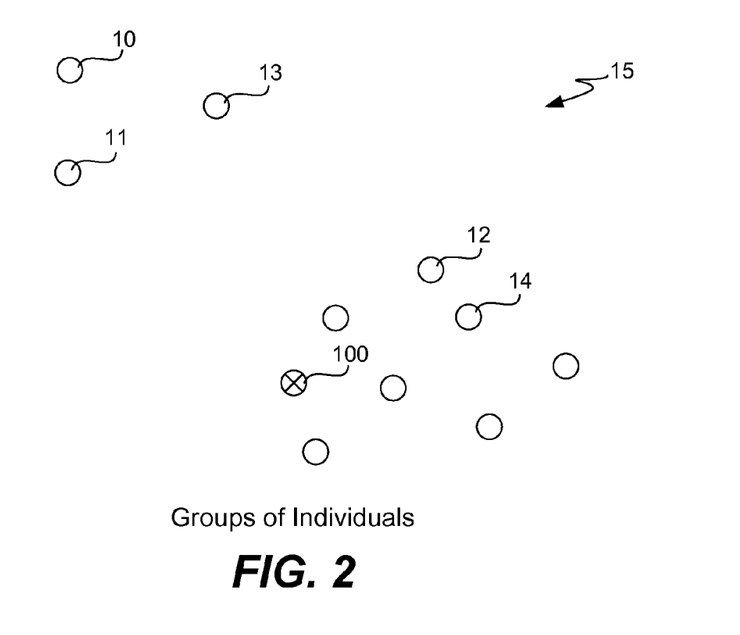
FIG. 2 is a block diagram showing groups of individuals who also have a known relationship with an individual.

FIG. 2 is a block diagram showing groups of individuals 15 who also have a known relationship with individual 100. In this situation, although group members 10, 11 and 13 have wondered some distance from the main group, individual member 100 is still in relatively close proximity to the main group of individuals 12, 14, etc. Accordingly, no alert need be generated because individual 100 is still in good company by remaining with most members of the group.

Figure 3:
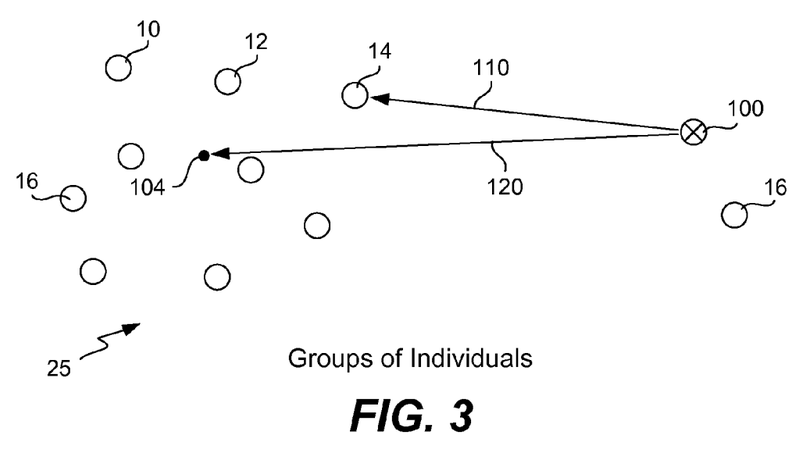
FIG. 3 is a block diagram showing groups of individuals having a relationship with an individual.

FIG. 3 is a block diagram showing groups of individuals 25 having a relationship with individual 100. In this situation, group members 100 and 16 are some distance from the main group. Because individual 100 is relatively far from the main group, even though individual 100 is relatively close to individual 16, an alert maybe generated because the distance from the main group is too much. The calculated distance from the group for the individual 100 may use the distance 110 which is the distance to the closest member 14 of the main group, or may use the distance 120 which is the distance to more or less the geographic center of all members of the main group, or may use any other suitable distance to estimate how far the individual 100 is from the main group.

Setup Group

Figure 4:
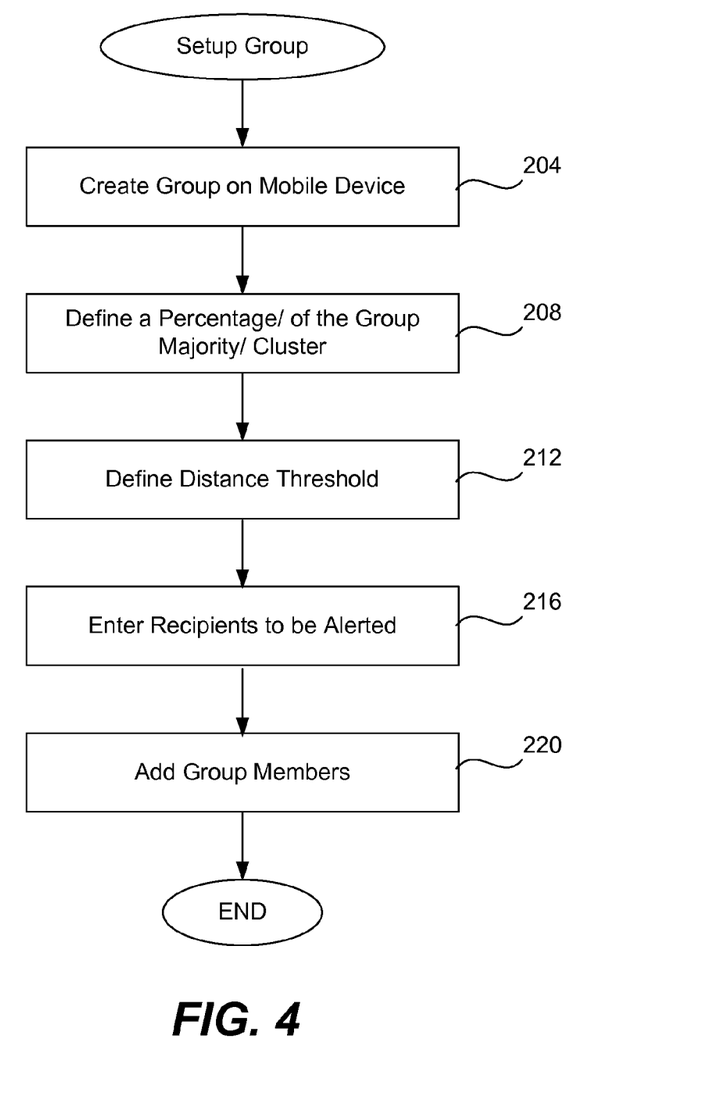
FIG. 4 is a flow diagram describing one embodiment by which a proximity group is set up.

FIG. 4 is a flow diagram describing one embodiment by which a proximity group is set up. In step 204 a software application on the mobile telephone (or similar mobile device) of a protected individual (such as a child) is used to enter configuration settings for a particular proximity group. These settings may be saved into persistent storage of the mobile telephone. For example, if the protected individual is a child, and a parent wishes to set up a proximity group indicating that the child is in good company as long as he or she stays in relatively close proximity to other members of the group, a proximity group "school" may be defined within the software application. This school group will include the child's classmates, and potentially teachers and parents. These settings may include the name of the group (a group identifier), an identifier for the device of the protected individual, default location information for the group, etc.

In step 208 a certain percentage, majority or cluster of the total members in the school group is defined as a minimum threshold to which the protected individual should keep in relatively close proximity. It may be determined that the individual must keep close to a certain percentage of the entire group, must keep close to the majority of the group, or must keep in close proximity to any cluster of group members. It is an implementation decision, for the purposes of calculating a percentage or majority, whether or not the individual is considered a member of the group. For example, if the individual is considered a member of the group and there are eleven individuals total, then a majority would be six people (including the individual). If the individual is not considered a member of the group, then a majority might be five people.

For instance, if a percentage is used and should the group be quite small, such as one other child with whom the protected child walks home each day, then the minimum threshold may be 100%, indicating that the protected child must always be in close proximity to the other child. On the other hand, if the school group includes all fifty of the child's classmates and other teachers, it may not be necessary (and probably unreasonable) for the protected child to always be in close proximity to all of his or classmates. In this situation, the minimum threshold may be on the order of 20%, indicating that the protected child should always be around about ten of his or classmates. Or, assuming that the protected child is on a field trip with all classmates in a fairly busy area, it may be reasonable to set the minimum threshold at a higher percentage, indicating that it is best if the protected child stay in proximity to most of the group. Alternatively, a discrete number of individuals may be specified instead of a percentage (e.g., six people out of a group size of ten people).

Alternatively, it may be specified that the individual must keep in close proximity to a majority of the group. While specifying a percentage (explained immediately above) allows the individual the freedom to remain in proximity to a certain number of members of the group, specifying a majority means that the individual must remain within a certain distance of the majority, regardless of how many other group members he or she is with. In this situation, the location of a majority of group members will be determined and then compared to the location of the individual. A majority may be defined as half of the group, at least half of the group, or a super majority such as two thirds of the group etc.

Or, this step defines that the protected individual must be in relatively close proximity to the greatest concentration of members in the cluster. For example, if a small number of group members are clustered at the entrance to school, and many other members are distributed throughout the neighborhood, the protected individual must be in close proximity to the cluster at the school entrance, even though this may not be a majority of the group members.

In step 212 a minimum distance threshold is defined that dictates how close the protected individual must be to the other group members. For example, a number may be chosen such as 10 m (where it is desired to keep the child very close to the group) or 50 m (where the children are playing in a fairly large area). Also, a distance calculation scheme is chosen such as shown in FIG. 3, where the distance may be calculated from the protected individual to more or less the geographic center of the main group, to the closest member of the main group, to the farthest member of the main group, using an average (or medium or mode) of all distances from the protected individual, or using some other distance calculation scheme.

In step 216 any number of recipients and communication means are entered in order to alert these recipients if necessary. For example, the e-mail address, telephone number, SMS number, Skype name, facsimile number, or other identification means for sending electronic communication or calling a recipient are entered for each recipient. These identification means are stored in persistent storage of the mobile device in association with the above-mentioned software application. If it becomes necessary (as described below) to send an alert because the protected individual has strayed from the proximity group, then an alert message will be sent to these identification means in storage. In one embodiment, these recipients may include (in addition to external parties) any or all of the members of the group. In this way, the group members are informed that the protected individual has strayed from the group and may take immediate action.

In step 220 any number of group members are added into a database of the mobile telephone in association with the software application. A group member may be added simply by: entering the telephone number of his or her mobile device; entering some other identifier of his or her mobile device (such as MAC address, serial number, or other unique identifier); entering a name of a group member associated with his or her mobile device; telephoning a potential group member's device with the mobile telephone of the protected individual, or asking the potential group member to call the mobile telephone (thus allowing the mobile telephone to capture the telephone number of a potential group member); etc.

In terms of setting up a group of individuals (or mobile devices) using more sophisticated means, various technologies may be used. In one embodiment, text messages or telephone calls may be used to ask individuals if they would like to join the group. For example, the protected individual may send text messages (or make telephone calls) to prospective group members asking them if they would like to join, and if so, please respond. Once a response is received, the target mobile device then has a record of a unique identifier for each of the other mobile devices within the group, such as their telephone number.

In another embodiment, a software application running on each of the mobile devices may be used to detect other devices within the same Wi-Fi or other network. For example, implementation of the Zero Configuration Networking Standard will allow mobile devices to discover other devices and services on a local area network. One implementation of this standard is the Bonjour software available from Apple Inc., thus allowing the target device to search for and query other nearby devices as to whether they wish to join the group. Another possibility is use of the UPnP architecture which also supports zero configuration networking. A UPnP compatible device from any vendor can dynamically join a network, obtain an IP address, announce its name, convey its capabilities upon request, and learn about the presence and capabilities of other devices. Another similar technology is the Devices Profile for Web Services which is also used by a device to connect to a network, advertise itself and discover other devices. In any of these fashions, the target device can identify nearby devices and query whether they wish to join the local group. By inputting the group identifier (or by selecting it) into a wireless LAN or an Internet connection any nearby device can join the group.

Alternatively, another group member may be added to a proximity group by bringing the protected individual's mobile telephone into relatively close proximity to the mobile device of another group member and then detecting the presence of that other mobile device.

Another technique is to allow the protected device and potential group members to contact a Web server in the cloud over the Internet and subscribe to the local group in that way. The Web server then keeps track of group members, their unique identifiers and the target device, and provides this information to the protected device so that it may then calculate distance to the other devices. In this embodiment, the above steps are modified so that the Web server keeps track of the group information. For example, in step 204 the group name, its configuration settings, etc., are created in an application on the Web server. Likewise, the definition of a percentage, majority or cluster is also stored on the Web server in step 208. Similarly, the distance threshold and recipients to be alerted (whether group members or outside parties) are defined and stored on the Web server in steps 212 and 216.

Once the setup of a proximity group has been performed on the target individual's mobile device (or on the Web server) then the mobile software application (or the Web server application) is ready to begin monitoring the location of the protected individual.

Monitor Mobile Device

Figure 5:
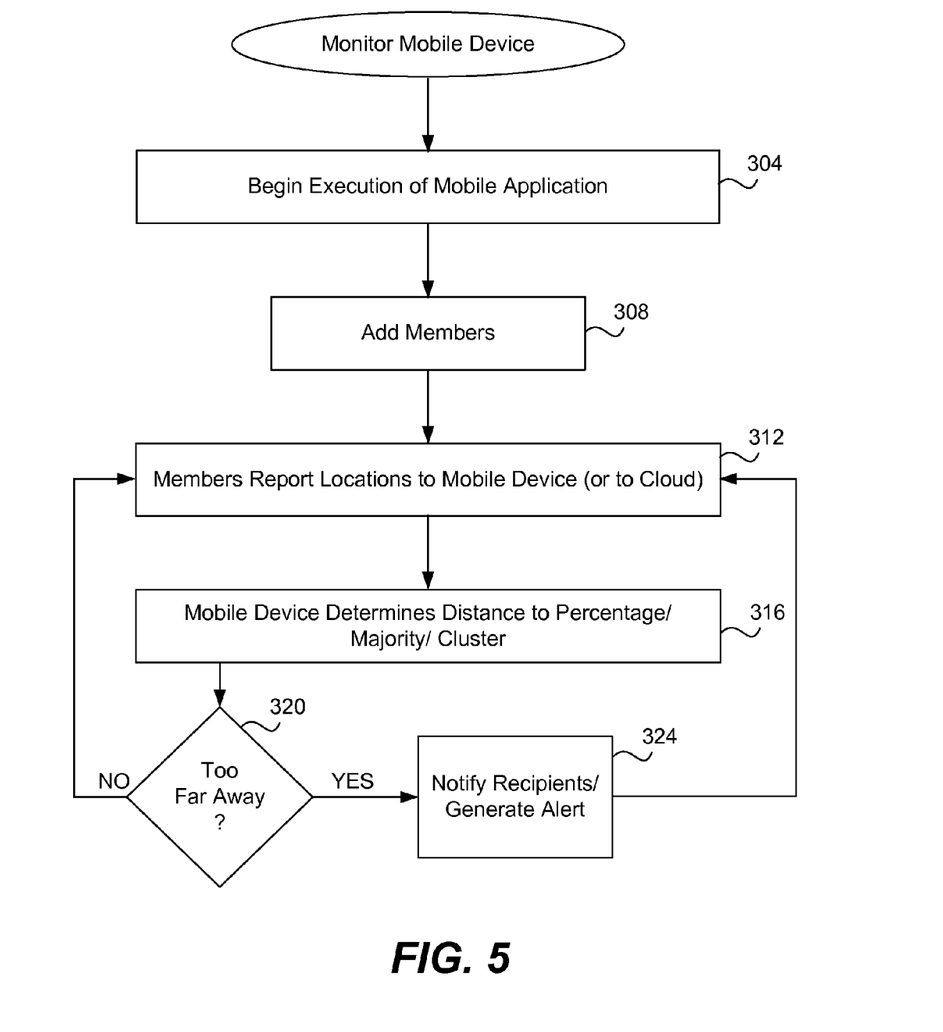
FIG. 5 is a flow diagram describing one embodiment by which the location of a mobile device is monitored.

FIG. 5 is a flow diagram describing one embodiment by which the location of a mobile device is monitored. During operation, the mobile device of the protected individual in question (or the Web server) will constantly monitor how close the individual is to the rest of the group and then send an alert to all of the recipients if necessary.

In step 304 the mobile application of the individual's mobile device begins execution and is available to add members or to determine the individual's distance to the proximity group. The proximity group may be chosen by default, or, a parent (or other supervising individual) may choose a particular proximity group (such as the school group) when the application begins execution. Preferably, each of the other mobile devices within the group also executes the mobile application, thus allowing these other devices to join the group at any time, push distance information to the protected device, receive alerts, send location to the Web server, etc.

In step 308, it is optional to add members to this proximity group at any time the mobile application is executing. These group members may be added as discussed above in step 220.

In step 312 once the mobile application begins executing and a proximity group has been chosen, a mobile telephone or the Web server in the cloud continuously receives location reports for each of the other mobile devices that are in the proximity group. In general, two basic techniques may be used to determine the distance to the other mobile devices: wireless communication and the global positioning system. To determine a distance from one mobile device to another using wireless communication, the invention may make use of a standard known as Wi-Fi Direct. As is known in the art, Wi-Fi Direct includes a protocol and a certification program administered by the Wi-Fi Alliance. Using Wi-Fi Direct, each mobile device supporting the standard will have embedded a software access point that provides a version of Wi-Fi Protected Setup, thus allowing these mobile devices to talk to one another without the need for a dedicated wireless access point such as a wireless router. When members of the group are within range of other members implementing Wi-Fi Direct, each member can connect to one another using the existing ad hoc protocol and gather any necessary information.

The target mobile device may then determine a distance to each of the other mobile devices in step 316 (described in more detail below) by assessing the quality of the signal strength from each device. Because each mobile device will be identified uniquely, the target device will know with which device it is communicating. By periodically polling each of the other devices (or alternatively, requiring the other devices to periodically push a communication to the target device), the target device can analyze the signal from each device and determine where it falls on a spectrum of strong to weak. Strong signals will indicate close devices, while weak signals indicate devices that are farther away.

It is realized that the majority of the power of a radio signal is lost in the air. Even in a perfect vacuum, a radio wave loses some of its energy since some energy is always radiated in directions other than the link axis. An algorithm known as the Free Space Path Loss (FSPL) measures the power loss in free space without any obstacles. If the power of a transmitter is known (roughly similar for mobile devices), and the received power is measured at a receiving device, then, in one embodiment, the FSPL can be used to estimate the distance between the transmitting device and the receiving device.

The advantage of using Wi-Fi Direct is that no third-party devices such as access points are needed to make the distance calculations and no nearby public network is needed.

The other technique is to use a global positioning system. Each mobile device will include a GPS receiver (functioning as a GPS navigation device) that constantly receives a satellite signal in order to determine its geographic location. In a first variation, each mobile device of the group will continuously report its location to a designated mobile device of the group. This designated mobile device may be the target device, may be the device of the group leader, or may be any other suitable device in the group. The devices may use a Wi-Fi network to communicate (such as Wi-Fi Direct), may use SMS messages, may use any standard local protocol such as Bluetooth, or may communicate using each other's HTTP connections. Once one device has received the GPS information from the other devices it will calculate distances as described below in step 316.

In a second variation, each mobile device of the group sends its location to the Web server described above. The Web server is then able to calculate the distances as described below in step 316 and report back to the group leader, the protected individual, other group members, or other recipients as necessary. In both of these variations, the device or computer receiving the GPS data may periodically poll the mobile devices in order to pull the information from them, or the device or computer may have the GPS data pushed to it periodically.

In step 316 the designated mobile device or the Web server calculates a distance measurement from the device of the protected individual to a characteristic of all mobile devices of the group using the percentage, majority or cluster as defined in step 208. This distance measurement may be calculated in many different ways. If the only requirement is that the protected individual be in close proximity to a single member of the group then the calculation is simplistic. On the other hand, if there many group members and the protected individual need only be close to a certain percentage of those members, then the calculation may be more complex depending upon the scheme used.

Next, in step 320 it is determined whether the distance measurement calculated in step 316 is greater than the distance threshold defined in step 212. If not, then the mobile application of the designated device (or the Web server) continues to receive report locations from all members in step 312 and will continuously calculate a distance measurement in step 316 and compare it to the predefined distance threshold. No alert need be generated in this situation. On other hand, if the distance measurement is greater than the distance threshold, then control moves to step 324 and all recipients defined in step 216 are alerted.

The contents of the alert message may include an identification of the protected individual, his or her mobile telephone, the distance measurement, an identification of the closest group members, and other relevant information. Using the addresses entered in step 216, the designated mobile device (or the Web server) then sends an alert message to all recipients using text messages, telephone calls, or other messages as dictated by the communication means specified in step 216. Alternatively, an alert may be generated on the mobile device of the individual when the distance measurement is greater than the distance threshold. For example, in addition to, or instead of, sending an alert message to any number of recipients, the protected individual may be alerted by his or her mobile device ringing, vibrating, flashing, playing a recorded message, etc. In this way, the individual may be warned to return to the group before an actual alert message is sent to the recipients. Of course, the individual may be alerted and the alert messages may be sent as well.

In addition to calculating distances in two dimensions, another embodiment determines the locations of all mobile devices and calculates a distance measurement in three dimensions. The distance threshold from step 212 may still be used, and in step 312 the reported locations include locations of other mobile devices not only on the same plane as the mobile device of the protected individual, but also mobile devices that are higher or lower in elevation. In this embodiment, the GPS navigation device of each mobile device should be capable of determining and sending an altitude indication as well as longitude and latitude. Or, some $3^{rd}$ party vendor provides a database to query a current device's altitude. Google provides an API that provides elevation data for all locations on the surface of the earth, allowing the elevation of a mobile device to be discovered assuming it is on the earth's surface and not on an artificial surface.

In another embodiment, a delay is introduced in step 324 in order to allow the protected individual to return to the main group. For instance, should a child briefly run away from the main group, only to run back a few seconds later, the mobile application could potentially trigger an alert during those few seconds when the child is away from the group. In this embodiment, a delay (on the order of seconds or minutes)

may be introduced in step 324 so that an alert message is not immediately sent when the distance measurement exceeds the distance threshold. Once the delay time is over, control returns to step 312 to calculate again the protected individual's position in relation to the group. If the individual has returned to the group then no alert need be sent. Once the delay time has been used once, on the second pass if the individual is still too far from the group then an alert message will be sent.

Distance Measurement Examples

Figure 6:
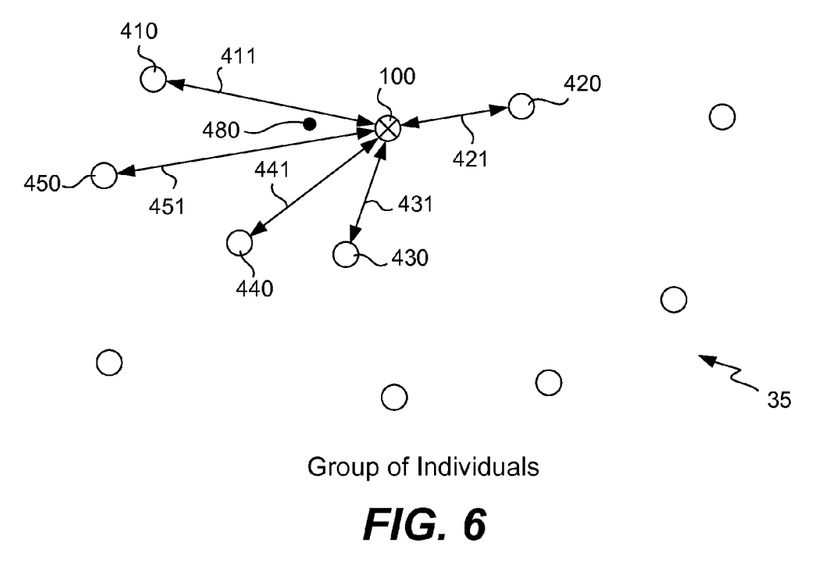
FIG. 6 illustrates a group of individuals demonstrating one embodiment in which the distance measurement may be calculated using a percentage of the group.

FIG. 6 illustrates a group of individuals 35 demonstrating one embodiment in which the distance measurement may be calculated using a percentage of the group. Knowing how many total members are in the group, and knowing the percentage required from step 208, the application determines how many discrete individuals of the group must be close to the protected individual. For example, FIG. 6 shows ten other group members; if the defined percentage of the group is 50% (or, alternatively, specified as five group members), then individual 100 must be within a certain proximity to at least five of the other group members.

Next, using the location information received from each group member in step 312, the application is able to calculate which five group members are the closest to the protected individual (using distances 411, 421, 431, 441 and 451) and will identify these five group members and their locations. In this example, the application identifies individuals 410, 420, 430, 440 and 450. Once these individuals and their locations are identified, the application will use a particular scheme to determine from which point a distance should be calculated to the protected individual. In a simple example, if the distance measurement is simply the distance to the closest individual, the distance 421 will be used. Or, if the measurement is from the farthest individual, the distance 451 will be used. Or, the average, median or mode of all distances (411, 421, 431, 441 and 451) may be used to calculate the distance measurement. In one particular embodiment, the centroid (or geographic center) of identified individuals 410-450 is determined. In this example, the centroid is indicated at point 480. Next, the distance measurement is calculated between individual 100 and point 480.

Figure 7:
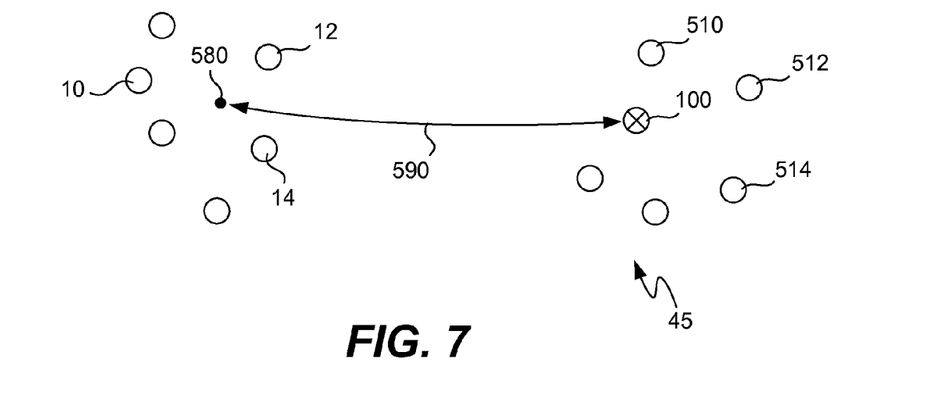
FIG. 7 illustrates a group of individuals demonstrating another embodiment in which the distance measurement may be calculated using a majority of the group.

FIG. 7 illustrates a group of individuals 45 demonstrating another embodiment in which the distance measurement may be calculated using a majority of the group. In this situation the protected individual 100 is not considered a member of the group (for purposes of calculating a percentage or determining a majority) and therefore, the majority of the group includes individuals 10-14, etc. located far to the left of the individual 100. Even though individual 100 is with five other group members 510-514, etc., he or she is clearly not with a majority of the group. The location of the majority of the group may be calculated by determining the location of the farthest individual 10 in that group, the location of the closest individual 14 in that group, or by determining the geographic center of the group, etc. In this situation, the approximate geographic center 580 of the majority of the group is determined and the distance measurement 590 is calculated between the individual 100 and this geographic center.

Figure 8:
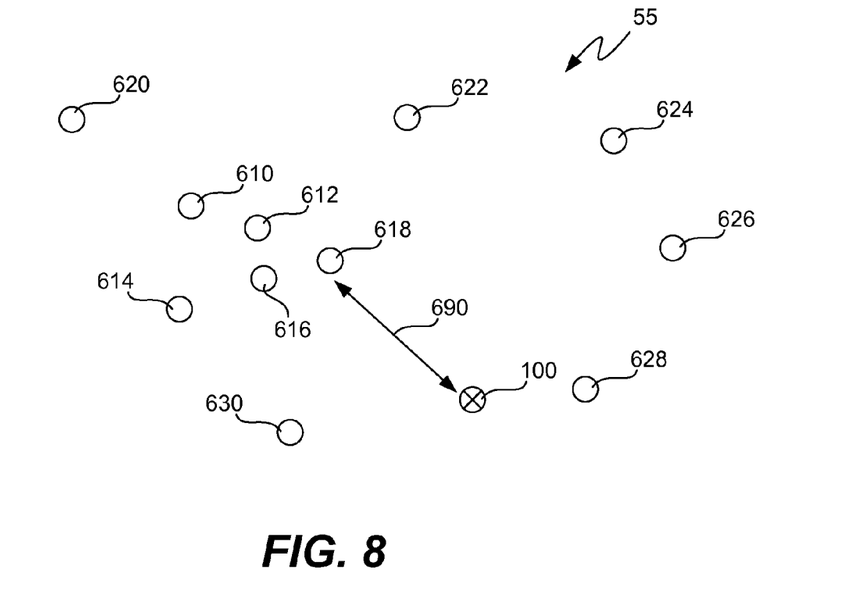
FIG. 8 illustrates a group of individuals demonstrating another embodiment in which the distance measurement may be calculated using a cluster of the group.

FIG. 8 illustrates a group of individuals 55 demonstrating another embodiment in which the distance measurement may be calculated using a cluster of the group. In this example, the group members are spread over a wide area with a smaller cluster of individuals 610-618 clustered near the center. Even though the majority of group members are distributed elsewhere, it is required that the individual 100 must be in close proximity to this cluster of individuals 610-618. This requirement can be advantageous where it is necessary that the individual stay close to the core the group, which is likely to include responsible adults. In a variation in this embodiment, the cluster may be defined as a single person (e.g., a teacher, parents or other supervising individual), and the protected individual may be required to stay close proximity to this person. A cluster may also be determined by the application by comparing the locations of all mobile devices in the group, and then choosing a cluster of mobile devices that are relatively close to one another relative to all of the other members of the group. For example, a particular geographic area with the highest concentration of members of the group may determine such a cluster. Once a particular cluster is identified, the location of the cluster may be determined by its centroid, its closest or farthest person etc.; in this situation a distance measurement 690 is calculated from the individual 100 to the closest person 618 of the cluster.

Figure 9:
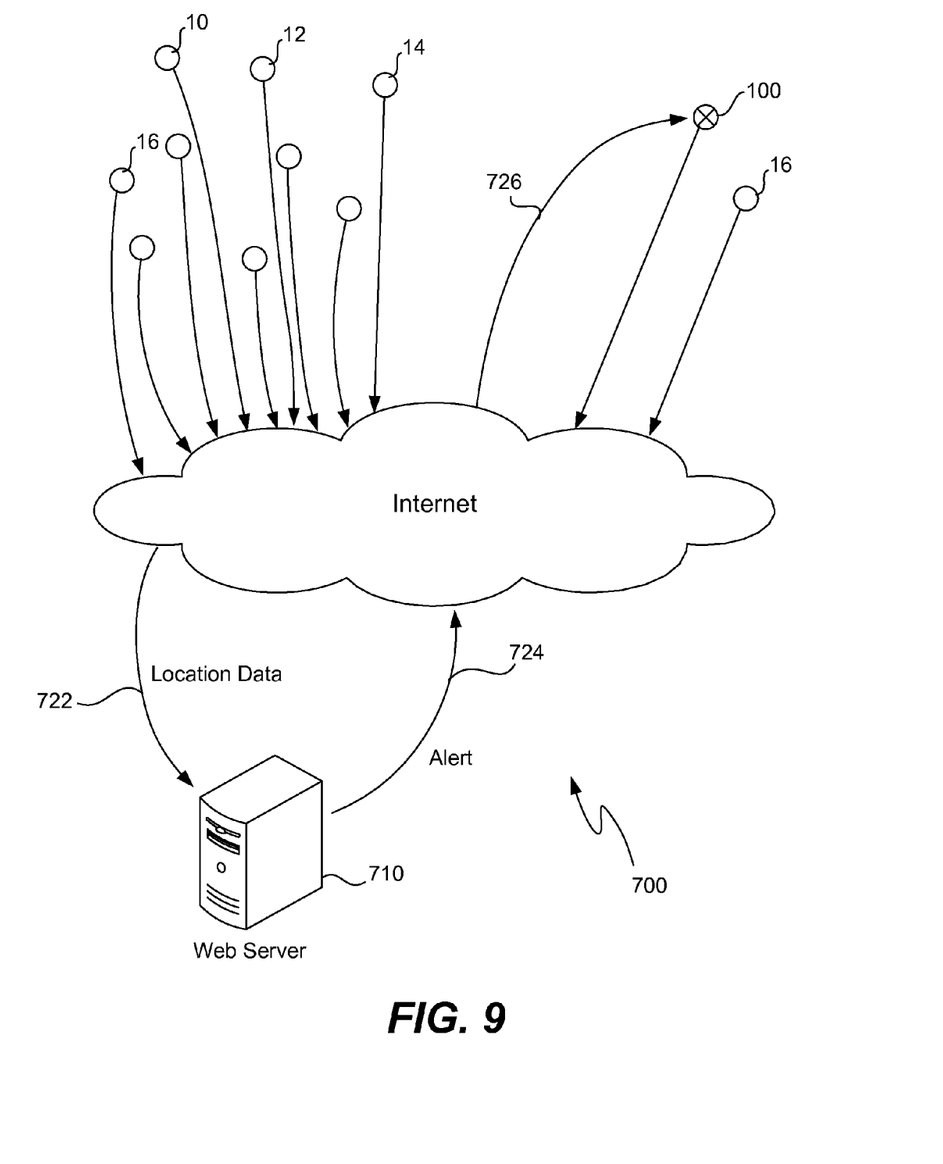
FIG. 9 illustrates a system in which a Web server is used for communication.

FIG. 9 illustrates a system 700 in which a Web server is used for communication. As shown, any suitable group of individuals having mobile devices (similar to the individuals of FIG. 3) send their GPS data 722 over the Internet to a Web server 710. As explained above, this Web server is then able to calculate distance measurements (according to any predefined settings) and determine whether the protected individual is too far from the group. If so, the Web server then generates an alert 724 which is transmitted back over the Internet and may be sent, for example, directly 726 to the protected individual's mobile device. Or as mentioned above, this alert may be sent to all members of the group, to a designated member of the group, or to other parties whose contact information has previously been stored in the Web server (using telecommunications, messaging, Internet, etc.).

Computer System Embodiment

Figure 10A:
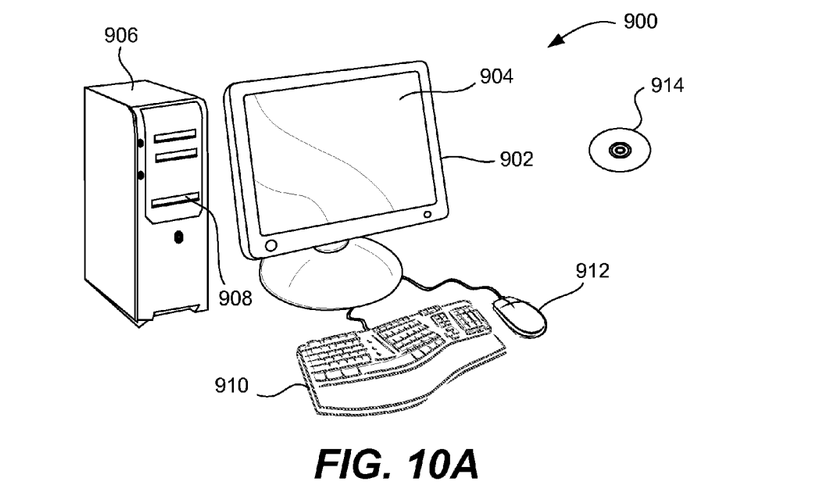
FIGS. 10A and 10B illustrate a computer system suitable for implementing embodiments of the present invention.
Figure 10B:
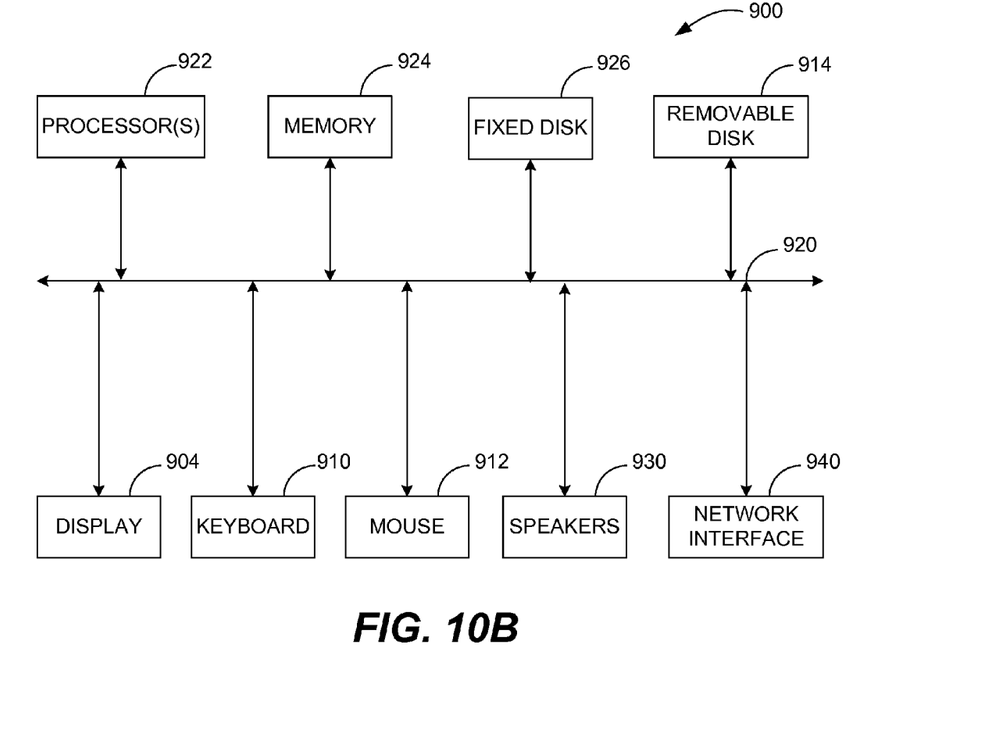

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of monitoring a target mobile device, said method comprising:
    identifying a plurality of mobile devices that belong to a group to which said target mobile device must remain in proximity;
    receiving, at said target mobile device, a location for each of said mobile devices;
    determining a majority of said mobile devices clustered in close proximity to one another relative to other of said mobile devices not in said majority, said majority being at least half of said plurality of mobile devices;
    calculating an actual distance from said target mobile device to said majority of said mobile devices;
    comparing said actual distance to a threshold distance; and
    generating an alert at said target mobile device when said actual distance is greater than said threshold distance.

2. The method as recited in claim 1 further comprising:
    transmitting an alert message from said target mobile device to a recipient, an identifier for said recipient being predefined in persistent storage of said target mobile device.

3. The method as recited in claim 1 further comprising:
    identifying said mobile devices by reference to a database of said target mobile device.

4. The method as recited in claim 1 further comprising:
    identifying said mobile devices by receiving manual input at said target mobile device identifying each of said mobile devices.

5. The method as recited in claim 1 further comprising:
    identifying said mobile devices by automatically and wirelessly receiving an indication of the presence of each of said mobile devices within a predefined proximity distance from said target mobile device.

6. The method as recited in claim 1 further comprising:
    waiting a specified delay time;
    recalculating said actual distance from said target mobile device to said majority of said mobile devices;
    comparing said actual distance to said threshold distance; and
    transmitting an alert message from said target mobile device to a recipient, an identifier for said recipient being predefined in persistent storage of said target mobile device.

7. The method as recited in claim 1 wherein said location for each of said mobile devices includes an altitude parameter, and wherein calculating an actual distance includes calculating said actual distance in three dimensions.

8. The method as recited in claim 1 wherein each of said mobile devices and said target mobile device are carried by a different person.

9. The method as recited in claim 1 further comprising:
    only generating an alert at said target mobile device when said actual distance is greater than said threshold distance.

10. The method as recited in claim 1 wherein said plurality of mobile devices is at least three mobile devices.

11. The method as recited in claim 1 further comprising:
    not generating an alert at said target mobile device when one of said other mobile devices not in said majority is at a distance from said target mobile device that is greater than said threshold distance.

12. A method of monitoring a target mobile device, said method comprising:
    identifying a plurality of mobile devices that belong to a group to which said target mobile device must remain in proximity;
    receiving, at said target mobile device, a location for each of said mobile devices;
    determining that said target mobile device must remain in proximity to at least two of said mobile devices;
    identifying at least two of said mobile devices that are closest to said target mobile device;
    calculating an actual distance from said target mobile device to said at least two of said mobile devices;
    comparing said actual distance to a threshold distance; and
    generating an alert at said target mobile device when said actual distance is greater than said threshold distance.

13. The method as recited in claim 12 further comprising:
    transmitting an alert message from said target mobile device to a recipient, an identifier for said recipient being predefined in persistent storage of said target mobile device.

14. The method as recited in claim 12 further comprising:
identifying said mobile devices by reference to a database of said target mobile device.

15. The method as recited in claim 12 further comprising:
calculating said actual distance using GPS data received from said mobile devices.

16. The method as recited in claim 12 further comprising:
calculating said actual distance by wirelessly receiving an indication of the location of each of said mobile devices relative to said target mobile device.

17. The method as recited in claim 12 further comprising:
waiting a specified delay time;
recalculating said actual distance from said target mobile device to said majority of said mobile devices;
comparing said actual distance to said threshold distance; and
transmitting an alert message from said target mobile device to a recipient, an identifier for said recipient being predefined in persistent storage of said target mobile device.

18. The method as recited in claim 12 wherein generating said alert at said target mobile device includes outputting a warning that is perceived by a user in possession of said target mobile device.

19. The method as recited in claim 12 wherein each of said mobile devices and said target mobile device are carried by a different person.

20. The method as recited in claim 12 further comprising:
only generating an alert at said target mobile device when said actual distance is greater than said threshold distance.

21. The method as recited in claim 12 wherein said plurality of mobile devices is at least three mobile devices.

22. The method as recited in claim 12 further comprising:
not generating an alert at said target mobile device when one of said mobile devices other than said at least two of said mobile devices is at a distance from said target mobile device that is greater than said threshold distance.

* * * * *